US009043870B1

United States Patent
Barenholz et al.

(10) Patent No.: US 9,043,870 B1
(45) Date of Patent: May 26, 2015

(54) AUTOMATED SIGN UP BASED ON EXISTING ONLINE IDENTITY

(71) Applicant: Google Inc., Mountain View, CA (US)

(72) Inventors: Tzvi Itzhak Barenholz, Raanana (IL); Ilan Caron, Herzliya (IL); Gregory Dardyk, Petach Tikva (IL); Ari Leichtberg, Zichron Yaakov (IL); Mor Miller, Raanana (IL); David Oren, Haifa (IL); Eric Sachs, Redwood City, CA (US); Yaniv Shuba, Givatayim (IL)

(73) Assignee: Google Inc., Mountain View, CA (US)

( * ) Notice: Subject to any disclaimer, the term of this patent is extended or adjusted under 35 U.S.C. 154(b) by 65 days.

(21) Appl. No.: 13/649,299

(22) Filed: Oct. 11, 2012

Related U.S. Application Data

(60) Provisional application No. 61/576,477, filed on Dec. 16, 2011.

(51) Int. Cl.
| | |
|---|---|
| *H04L 29/06* | (2006.01) |
| *G06F 21/31* | (2013.01) |
| *G06F 21/30* | (2013.01) |
| *H04W 12/06* | (2009.01) |

(52) U.S. Cl.
CPC .............. *H04L 63/10* (2013.01); *G06F 21/31* (2013.01)

(58) Field of Classification Search
CPC ......... H04L 63/10; G06F 21/31; G06F 21/30; H04W 12/06
USPC ....................................................... 726/2–28
See application file for complete search history.

(56) References Cited

U.S. PATENT DOCUMENTS

| | | | |
|---|---|---|---|
| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |

(Continued)

FOREIGN PATENT DOCUMENTS

WO        WO02079984       10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Michael Chao
*Assistant Examiner* — Shiuh-Huei Ku
(74) *Attorney, Agent, or Firm* — Patent Law Works LLP

(57) ABSTRACT

An automated system for signing up users invited to join a site based on their existing identity includes an invitation generator, an invite processor, a federated authentication module, a user information retrieval module, an account population and creation module, and a user interface module. The automated sign up module is responsive to an invite request. The automated sign up module sends an authorization request, receives the authorization response, verifies the response and retrieves user data. The automated sign up module uses the retrieved data to populate a sign up form and initialize an account. The automated sign up module sends new account information to a user for confirmation. Once confirmation has been received, the automated sign up module creates the new account and allows the user to access the system. The present disclosure includes a method for signing up users invited to join a site based on their existing identity.

32 Claims, 9 Drawing Sheets

(56) References Cited

U.S. PATENT DOCUMENTS

| | | | |
|---|---|---|---|
| 7,366,990 B2 | 4/2008 | Pitroda | |
| 7,555,110 B2 | 6/2009 | Dolan et al. | |
| 7,610,287 B1 | 10/2009 | Dean et al. | |
| 7,631,346 B2 * | 12/2009 | Hinton et al. | 726/8 |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0173742 A1 * | 8/2006 | Heene | 705/14 |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2011/0030043 A1 * | 2/2011 | Jones et al. | 726/7 |
| 2011/0098156 A1 | 4/2011 | Ng et al. | |
| 2011/0289567 A1 * | 11/2011 | Bauer-Hermann et al. | 726/6 |
| 2012/0047169 A1 * | 2/2012 | Schroeder et al. | 707/770 |
| 2012/0311686 A1 * | 12/2012 | Medina et al. | 726/7 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

AUTOMATED SIGN UP BASED ON EXISTING ONLINE IDENTITY

CROSS REFERENCE TO RELATED APPLICATIONS

This application claims priority under 35 USC §119(e) to U.S. Application No. 61/576,477, entitled "Automated Sign up Based on Existing Online Identity" filed Dec. 16, 2011, the entirety of which is herein incorporated by reference.

BACKGROUND

The present disclosure relates to user interactions with electronic systems.

There can be numerous different products or services available over the Internet. Each of these different services has a sign up process in which users must provide different types and amounts of information and this information may be used to create an account, a user name and access information for that particular product or service. For many products and services much of the information needed to complete the sign up process can be the same.

SUMMARY

According to one innovative aspect of the subject matter described in this disclosure, a system for signing up a user of a social network based upon an existing identity includes a processor and a memory storing instructions that, when executed, cause the system to: receive an invite request; retrieve user account data for the user; initialize an account and populate a sign up form with the retrieved user account data; receive a confirmation of the retrieved user account data; and create the account for the user using the populated sign up form with the retrieved user account data for the user.

In general, another innovative aspect of the subject matter described in this disclosure may be embodied in methods that include: receiving an invite request; retrieving user account data for the user; initializing an account and populating a sign up form with the retrieved user account data; receiving a confirmation of the retrieved user account data; and creating the account for the user using the populated sign up form with the retrieved user account data for the user.

Other implementations of one or more of these aspects include corresponding systems, apparatus, and computer programs, configured to perform the actions of the methods, encoded on computer storage devices.

These and other implementations may each optionally include one or more of the following features. For instance, the features include: the user account data for the user is retrieved from an identity provider and the user account data includes one or more of a first name, a last name, a user name and an electronic mail address; and the identity provider is a service for which the user has an existing account or identity; the offer message is sent by an electronic mail; the invite request is presented in a user interface similar to a service for which the user has an existing account or identity; and the populated sign up form with the retrieved user account data for the user has an interface similar to a service for which the user has one or more of an existing account and an existing identity.

For instance, the operations further include: sending an offer message, the offer message including an invite link that when selected by the user generates the invite request; building an identifier; creating an authorization uniform resource locator including the identifier; sending the authorization uniform resource locator; sending an authorization request to an identity provider; receiving an authorization response from the identity provider; verifying the authorization response, the authorization response used in retrieving the user account data for the user; and sending for confirmation the populated sign up form with the user account data.

The present disclosure may be particularly advantageous in a number of respects. First, the system may be advantageous because the user does not need to input information and merely needs to accept a confirmation to create a new account on a site. Second, the system utilizes a user interface similar to that of their existing account, thus making the process familiar as well as simple. Third, the system eliminates the need to show a captcha test, password or other verification mechanisms as part of the sign up process because the user's identity may be already verified.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

While the present disclosure will now be described in the context of automatic signing up of a user for a new account in a social network, it should be understood that the terms "products" and "services" can be used interchangeably throughout this specification and can be used herein to encompass their plain and ordinary meaning including, but not limited to a particular online service, online product, online software that requires that its users sign up to gain access to the functionality of the online service, online products or online software.

Figure 1:
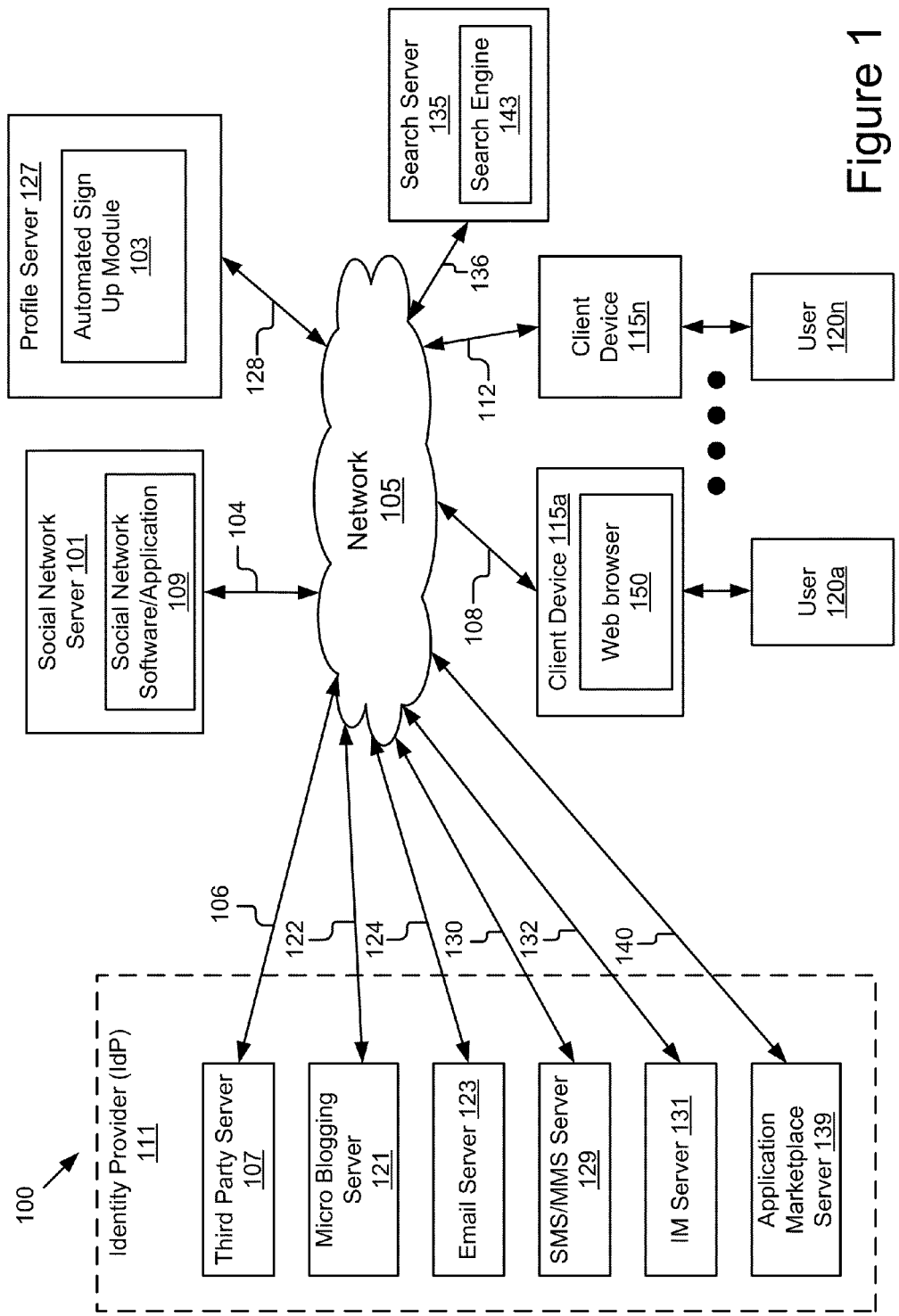
FIG. 1 is a block diagram illustrating an example system for an automated sign up based on an existing identity.

FIG. 1 illustrates a block diagram of a sign up system 100 for products or services according to some implementations of the present disclosure. The illustrated sign up system 100 for products or services includes client devices 115a-115n (also referred to herein individually and collectively as 115) that can be accessed by users 120a-120n (also referred to herein individually and collectively as 120), and a profile server 127 having an automated sign up module 103. The system 100 also includes a number of products or services offered by the social network server 101, a third party server 107, a micro blogging server 121, an email server 123, a Short Message Service (SMS)/Multimedia Messaging Service (MMS) server 129, an instant messaging (IM) server 131, a search server 135 and an application marketplace server 139. In the illustrated implementation, these entities are communicatively coupled via a network 105. These other systems 101, 107, 121, 123, 129, 131, 135 and 139 are merely examples and the system 100 in some implementations includes a document server, a blogging server, a new feed server, an ad server, a video sharing server, a photo sharing server, a map server, other third party servers, etc.

The client devices 115a-115n in FIG. 1 are used by way of example. While FIG. 1 illustrates two client devices 115a, 115n, the present disclosure applies to multiple different system architectures having one or more client devices 115. Furthermore, while one network 105 is coupled to the client devices 115a-115n, the profile server 127 and the other product servers 101, 107, 121, 123, 129, 131, 135 and 139, in practice a single or multiple networks 105 can be connected to the entities. Furthermore, while one third party server 107 is shown, the system 100 could include one or more third party servers 107.

In some implementations, the social network server 101 is coupled to the network 105 via signal line 104. The social network server 101 also includes a social network software/application 109. Although one social network server 101 is shown, multiple social network servers may be present. A social network may be a type of social structure where the users can be connected by a common feature. The common feature includes relationships/connections, e.g., friendship, family, work, an interest, etc. The common features can be provided by one or more social networking systems, for example, those included in the system 100, including explicitly-defined relationships and relationships implied by social connections with other online users, where the relationships form a social graph. In some examples, the social graph can reflect a mapping of these users and how they may be related. The phrase social graph as used herein encompasses its plain and ordinary meaning including, but not limited to, a file that includes the relationships between the users in a social network. For example, users can be friends, acquaintances, having business relationships, one user following another user, one user subscribing to another user, etc.

Furthermore, it should be understood that the social network server 101 and the social network software/application 109 can be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others of general interest or a specific focus.

While shown as operational on the profile server 127 in FIG. 1, in other implementations at least part of the automated sign up module 103 may be operational on the third party server 107 that can be connected to the network 105 via signal line 106 or other servers 101, 121, 123, 129, 131, 135 and 139. The automated sign up module 103 interacts with the other servers 101, 107, 121, 123, 129, 131, 135 and 139 via the network 105. The automated sign up module 103 is also coupled for communication with the client device 115a, which can be connected to the network 105 via signal line 108. The user 120a interacts with the client device 115a. Similarly, the client device 115n is coupled to the network 105 via signal line 112 and the user 120n interacts with the client device 115n. The automated sign up module 103 can be stored in a combination of the devices and servers, or in one of the devices or servers.

The client device 115 can be a computing device that includes a memory and a processor, for example a laptop computer, a desktop computer, a tablet computer, a mobile telephone, a personal digital assistant (PDA), a mobile email device, a portable game player, a portable music player, a television with one or more processors embedded therein or coupled thereto or other electronic devices capable of accessing a network.

The network 105 can be a conventional type, wired or wireless, and may have various configurations, e.g., a star configuration, token ring configuration or other configurations. Furthermore, the network 105 may include a local area network (LAN), a wide area network (WAN) (e.g., the Internet), and/or other interconnected data path across which multiple devices may communicate. In other implementations, the network 105 may be a peer-to-peer network. The network 105 may also be coupled to or includes portions of a telecommunications network for sending data in a variety of different communication protocols. In yet other implementations, the network 105 includes Bluetooth communication networks or a cellular communications network for sending and receiving data, e.g., via short messaging service (SMS), multimedia messaging service (MMS), hypertext transfer protocol (HTTP), direct data connection, WAP, email, etc.

The profile server 127 is coupled by signal line 128 to the network 105 for communication and cooperation with the other components of the system 100. The profile server 127 includes the automated sign up module 103 as will be described in more detail below with reference to FIGS. 2-4. The profile server 127 interacts with other systems 101, 107, 121, 123, 129, 131, 135 and 139 to retrieve/receive a login request and allow or deny access to these other systems 101, 107, 121, 123, 129, 131, 135 and 139. The profile server 127 also receives and stores user profile information including one or more of a user name, a password, a hint, a secret question, etc. In some implementations, the profile server 127 receives and sends information from and to the other systems 101, 107, 121, 123, 129, 131, 135 and 139 that allow the user 120a-120n to access the functionality of those systems 101, 107, 121, 123, 129, 131, 135 and 139. The profile server 127 also generates sign up offers, receives sign up invites and sends requests that can be processed by the automated sign up module 103 as described below. In some implementations, the profile server 127 cooperates with the other systems 101, 107, 121, 123, 129, 131, 135 and 139 to control access to those other systems 101, 107, 121, 123, 129, 131, 135 and 139.

The automated sign up module 103 interacts with other systems 101, 107, 115a-115n, 121, 123, 129, 131, 135 and 139 to provide sign up processes, to receive authorizations, and to retrieve user data for existing users of those systems. In portions of this application, the third party server 107, the micro blogging server 121, the email server 123, the SMS/MMS server 129, the instant messaging server 131 and the application marketplace server 139 will be referred to collectively and individually as online identity providers (IdP) 111. In some examples, the registration or creation of an account on the identity providers (IdP) 111 serves as a basis to create new accounts and pre-populate sign in forms for other systems. The automated sign up module 103 may also cooperate with the client devices 115 to generate and present user interfaces that allow the user to input information and selections related to the sign up process. In one implementation, the automated sign up module 103 receives or retrieves information from the other systems 107, 121, 123, 125, 127, 129, 131 and 135 (the identity providers 111). The automated sign up module 103 processes this information to automate the sign up process and reduce the amount of information that can be provided directly from the user 120 to sign up for new service. In some instances, the user 120 needs input confirmation to create a new account. The automated sign up module 103 interacts with the user 120 via client devices 115 to present the sign up interfaces. In particular, the automated sign up module 103 interacts with the web browser 150 of the client devices 115 to receive inputs and generate user interfaces as will be described in more detail below.

In some implementations, the automated sign up module 103 also cooperates with the third party server 107, the micro blogging server 121, the email server 123, the Short Message Service (SMS)/Multimedia Messaging Service (MMS) server 129, the instant messaging (IM) server 131, and/or the application marketplace server 139 to execute the sign up processes and retrieve user data from these servers. In some implementation, the automated sign up module 103 also executes log in processes, the sign up processes, and receives data related to the sign up process from the search server 135 that includes a search engine 143 and is coupled to the network 105 via signal line 136. In some implementations, the search server 135 includes a search engine 143 for retrieving results that match search terms from the Internet. The web browser 150 and the automated sign up module 103 can be used to manage the sign up process for the third party server 107 via signal line 106, the micro blogging server 121 via signal line 122, the profile server 127 via signal line 128, the client devices 115 via signal lines 108 and 112, the email server 123 via signal line 124, the SMS/MMS server 129 via signal line 130, the IM server 131 via signal line 132 and the application marketplace server 139 via signal line 140.

In some implementations, the social network server 101, the third party server 107, the micro blogging server 121, the email server 123, the profile server 127, the SMS/MMS server 129, the IM server 131, the search server 135 and the application marketplace server 139 can be hardware servers including a processor, a memory, and network communication capabilities. The client devices 115 can be portable computing devices. These systems 101, 107, 115, 121, 123, 127, 129, 131, 135 and 139 could be one or more computing devices, for example, a laptop computer, a desktop computer, a tablet computer, a mobile telephone, a personal digital assistant (PDA), a mobile email device, a portable game player, a portable music player, a portable music player, a television with one or more processors embedded therein or coupled thereto and/or other electronic devices capable of accessing a network. As will be described below, the present technologies can operate on different models than a client-server architecture. For example, the client devices 115 may include the automated sign up module 103 and include different services, but the user interface lives as a native application on the client device 115 and there can be flags controlling what may be shown by default. Thus, the client device 115 could use this same sign up method without a network connection.

Figure 2:
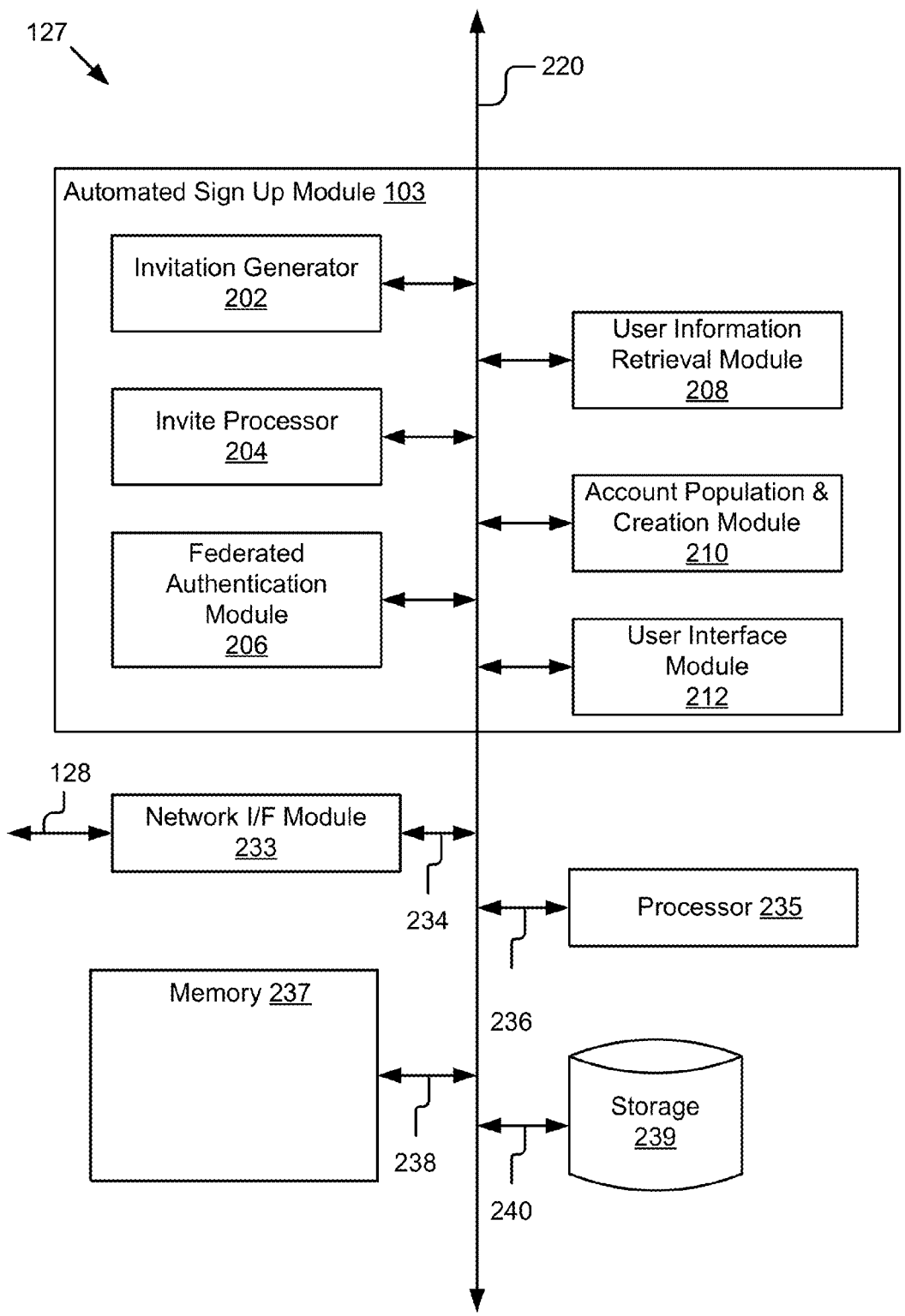
FIG. 2 is a block diagram illustrating an example of the automated sign up module in a profile server.

FIG. 2 illustrates a profile server 127 according to some implementations of the present disclosure. In this implementation, the profile server 127 includes: a network interface (I/F) module 233, a processor 235, a memory 237, storage 239 and the automated sign up module 103.

The network interface module 233 is coupled to the network 105 by signal line 128 and to a bus 220 via signal line 234. The network interface module 233 includes ports for wired connectivity including but not limited to USB, SD, or CAT-5, etc. The network interface module 233 links the processor 235 to the network 105 that may in turn be coupled to other processing systems. The network interface module 233 provides other conventional connections to the network 105 using standard network protocols, e.g., TCP/IP, HTTP, HTTPS and SMTP. In other implementations, the network interface module 233 includes a transceiver for sending and receiving signals using WiFi, Bluetooth® or cellular communications for wireless communication.

The processor 235 includes an arithmetic logic unit, a microprocessor, a general purpose controller or some other processor array to perform computations and provide electronic display signals to a display device. The processor 235 is coupled to the bus 220 via signal line 236 for communication with the other components. Processor 235 processes data signals and may include various computing architectures including a complex instruction set computer (CISC) architecture, a reduced instruction set computer (RISC) architecture, or an architecture implementing a combination of instruction sets. Although a single processor is shown in FIG. 2, multiple processors may be included. Other processors, operating systems, sensors, displays and physical configurations can be possible.

The memory 237 stores instructions and/or data that may be executed by processor 235. The memory 237 is coupled to the bus 220 via signal line 238 for communication with the other components. The instructions and/or data may include code for performing some or all of the techniques described herein. The memory 237 may be a dynamic random access memory (DRAM) device, a static random access memory (SRAM) device, flash memory or some other memory device. In some embodiments, the automated sign up module 103 is part of memory 237 and includes instruction store in memory 237 and executable by processor 235.

Storage 239 includes a non-volatile memory or similar permanent storage device and media, e.g., a hard disk drive, a floppy disk drive, a CD ROM device, a DVD ROM device, a DVD RAM device, a DVD RW device, a flash memory device, or some other mass storage device for storing information on a more permanent basis. In some implementations, the storage 239 stores data, information and instructions used by the automated sign up module 103. Such stored information may include information about users, information about messages, and other information retrieved by the automated sign up module 103. In some implementations, the storage 239 also stores data and other information utilized for the sign up processes. The storage 239 is coupled by the bus 220 via signal line 240 for communication with other components 103, 202, 233, 235 and 237 of the profile server 127.

As shown in FIG. 2, the profile server 127 includes the automated sign up module 103. In some instances, the automated sign up module 103 includes an invitation generator 202, an invite processor 204, a federated authentication module 206, a user information retrieval module 208, an account population and creation module 210, and a user interface module 212. Each of these components is coupled to the bus 220 for communication with each other and the other components of the profile server 127.

At a general level, the automated sign up module 103 can be responsible for communication with the client devices 115a-115n. The automated sign up module 103 sends offers, receives invite requests, sends authorization requests, initializes accounts, and sends and receives user confirmations. The automated sign up module 103 is coupled to the social network server 101, the clients 115 and the identity providers 111. The automated sign up module 103 can be particularly advantageous because it may be able to sign up a new user using an invite request and a user confirmation.

The invitation generator 202 can be software or routines for generating and sending an offer to a user. In some implementations, the invitation generator 202 can be responsive to requests from existing users to invite others to join a network or service. In some implementations, a first user may interact with the invitation generator 202 by identifying a second user that may not be part of the network or service but to whom the first user would like to extend an offer to join the network or service. The invitation generator 202 interacts with the first user to acquire enough information to generate and send an offer to the second user. For example, the invitation generator 202 may cooperate with the user interface module 212 to present interfaces in response to which the first user inputs information about the second user, e.g., their email address. The invitation generator 202 uses this information and generates an electronic message and sends it to the address input by the first user. In some implementations, the invitation generator 202 also creates an initial record with other information provided by the first user that can be later used to identify the second user. In some implementations, the invitation generator 202 also includes in the email offer a link to the invite processor 204 so that the sign up process can be continued. Example offers and emails will be described in more detail below with reference to FIGS. 5 and 6. The invitation generator 202 is coupled to the bus 220 for communication with the user interface module 212, the invite processor 204, and the client device 115.

The invite processor 204 can be software or routines for processing invite requests that can be received from the client devices 115. The invite processor 204 is coupled for communication with the client devices 115, in particular, the web browser 150 running on the client device 115. The invite processor 204 receives and processes invite requests from the client devices 115 to sign up for a given service or product. The invite processor 204 receives the invite request, identifies the user and service associated with the request, and then processes the invite request to sign the user up for the service. The invite processor 204 serves as a controller to process invite requests including sending authorization requests, receiving authorization responses, verifying authorization responses, retrieving user data, creating a new account, initializing a new account, populating sign up forms, sending information for confirmation, receiving user confirmation, and allowing access to a product or service. The invite processor 204 is coupled for communication and cooperation with the federated authentication module 206, the user information retrieval module 208, the account population and the creation module 210, and the user interface module 212 to perform these functions. The operation of the invite processor 204 is described in more detail below with reference to FIGS. 3 and 4.

The federated authentication module 206 can be software or routines for generating and sending authorization requests and processing authorization responses. In some implementations, the federated authentication module 206 creates an authorization uniform resource locator (URL) that can be used by the client device 115 to send and return authorizations. In some implementations, the federated authentication module 206 can be responsive to requests and provides information to the invite processor 204. The federated authentication module 206 can be responsible for identifying the user, receiving authorization and credentials of the user, verifying the user and the credentials at an existing site that has identity information about the user and securing credentials that can be used by the automated sign up module 103 to retrieve identity information for the user. The federated authentication module 206 is coupled by the bus 220 for communication and cooperation with the client device 115, the invite processor 204, and the user information retrieval module 208.

The user information retrieval module 208 can be software or routines for retrieving and using identity information for a given user. The user information retrieval module 208 is coupled to receive authorization information from the federated authentication module 206. The user information retrieval module 208 uses the authorization information to gain access to an identity provider 111 and retrieve user identity information for a given user from the identity provider 111. For example, user identity information may include one or more of a user's name, age, gender, photos, contacts, street address, an alternate email address, a social graph, account information, account data, etc. Depending on the identity provider 111 more or less information may be retrieved by the user information retrieval module 208. The user information retrieval module 208 is coupled by the network interface module 233 and the network 105 to the identity providers 111. In some implementations, the user information retrieval module 208 is also coupled to the storage 239 to store retrieved user identity information at the profile server 127. In some implementations, the user information retrieval module 208 provides retrieved user information to the account population and creation module 210. The user information retrieval module 208 is coupled to the bus 220 for communication with the other components 202, 204, 206, 210 and 212 of the automated sign up module 103 and the network interface module 233, the processor 235, the memory 237 and the storage 239.

The account population and creation module 210 can be software or routines for creating an account for a user and/or populating a sign up form with user information. In some implementations, the account population and creation module 210 receives user identity information retrieved by the user information retrieval module 208. The account population and creation module 210 cooperates with the system in which an account can be created, e.g., the social network application 109. In some implementations, the account population and creation module 210 populates a sign up form with information and presents the populated sign up form to the user. Once a confirmation signal has been received from the user, an account may be created in the system from which the offer was generated using the information that was confirmed by the user in the sign up form. The account population and creation module 210 is coupled to the bus 220 for communication and cooperation with the other components 202, 204, 206, 208 and 212 of the automated sign up module 103 and the network interface module 233, the processor 235, the memory 237 and the storage 239.

The user interface module 212 can be software or routines for generating and providing user interfaces to the user. In some implementations, the user interface module 212 is coupled for communication with the web browser 150 of the client device 115. The user interface module 212 generates and presents user interfaces to present information to the user and receive commands related to the automated sign up process. In some implementations, the user interface module 212 generates and presents user interfaces similar to those shown in FIGS. 5-8 below. The user interface module 212 cooperates with the invite processor 204 to present the user interfaces of the present disclosure. The user interface module 212 cooperates with the account population and creation module 210 to receive account information and present the account information to the user for confirmation. The user interface module 212 is coupled to the bus 220 for communication with the other components 202, 204, 206, 208 and 210 of the automated sign up module 103 and the other components of the profile server 127.

Figure 3:
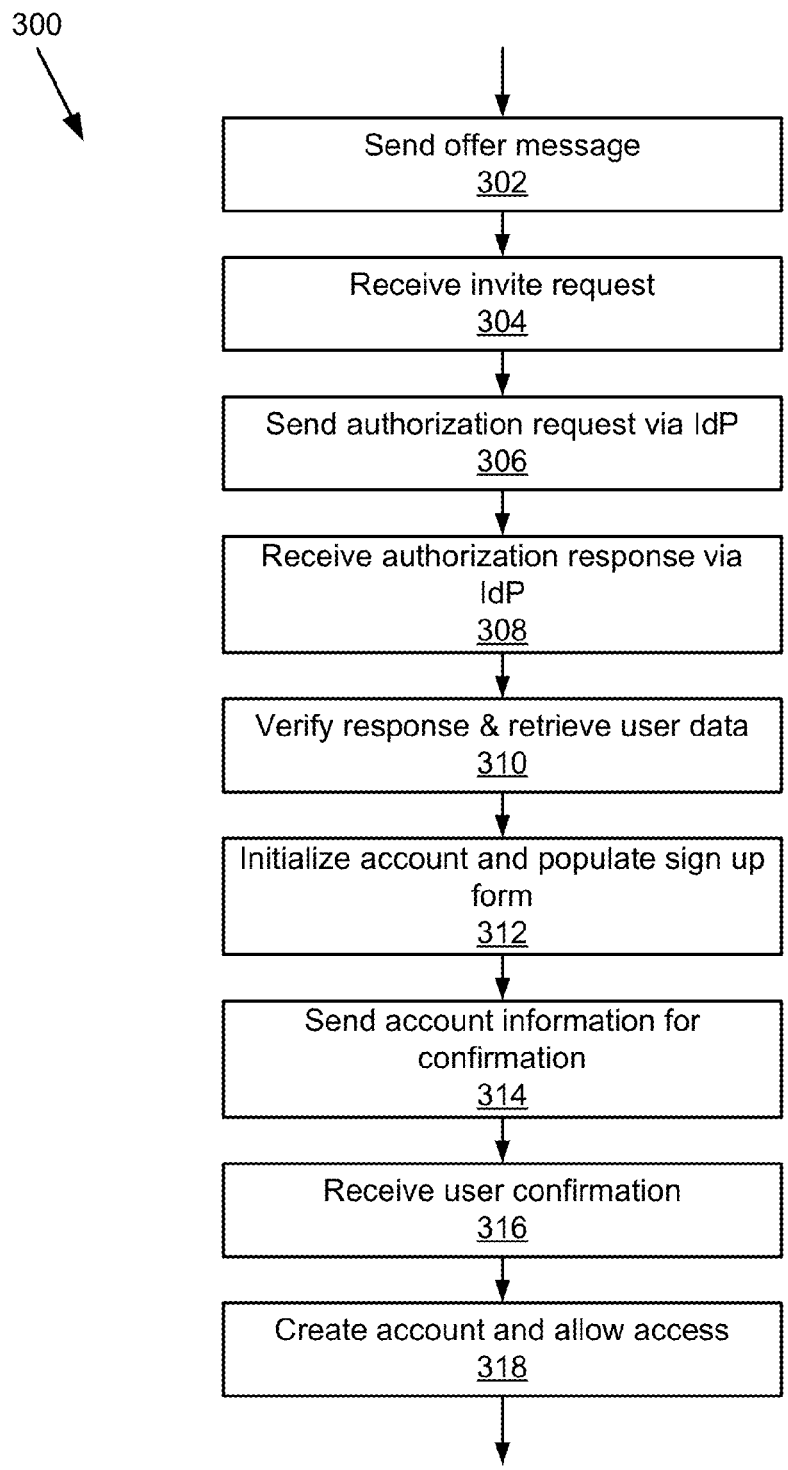
FIG. 3 is a flowchart of an example method for automated sign up based on an existing identity.

Referring now to FIG. 3, a method 300 for automated sign up based on an existing identity according to some implementations is described. The method 300 begins by generating and sending 302 an offer message. As described above, the offer message may be generated in response to a request from a first user that would like a second user to be invited to join a network or service. For example, a first user of the social network may want a second user to join the social network. The first user initiates a request that the automated sign up module 103 send an offer to the second user. The offer message may also be generated for known users of another system from which their identity can be retrieved or obtained. The offer may be sent to the user by electronic mail. The user receives the offer and if interested in joining the network or service responds to the offer and sends an invite request back to the automated sign up module 103. For example, the offer that can be an electronic mail message may include a link back to the automatic sign up module 103 and the link identifies the user and the network or service of interest. The method 300 receives 304 the invite request. Then the method 300 sends 306 an authorization request to an identity provider (IdP) 111 with which the user may be familiar. The identity provider 111 responds by sending an authorization response and the authorization response can be received 308 by the automated sign up module 103 from the identity provider (IdP) 111. The method 300 continues with the automated sign up module 103 verifying 310 the response. In other words, the identity provider 111 verifies to the automated sign up module 103 that the user is who they say they are. For example, an email account provider may verify the user. Then the method 300 retrieves 310 the user identity information (e.g., account data) from the identity provider 111. As noted above, the user identity information may include first name, last name, handle or username, email address, physical address, company, high school, age, gender, photos, social graph, contacts, account information, account data, etc. The method 300 continues by initializing 312 an account and using the retrieved user identity information (see operation 310 above) to populate 312 a sign up form for the new account. The populated sign up form for the new account may then be sent 314 to the user for confirmation. The user confirms information in the populated sign up form and sends a confirmation signal back to the automated sign up module 103. The method 300 receives 316 the user confirmation signal. Finally, the method 300 completes by creating 318 the account and allowing the user to access the account.

Figure 4:
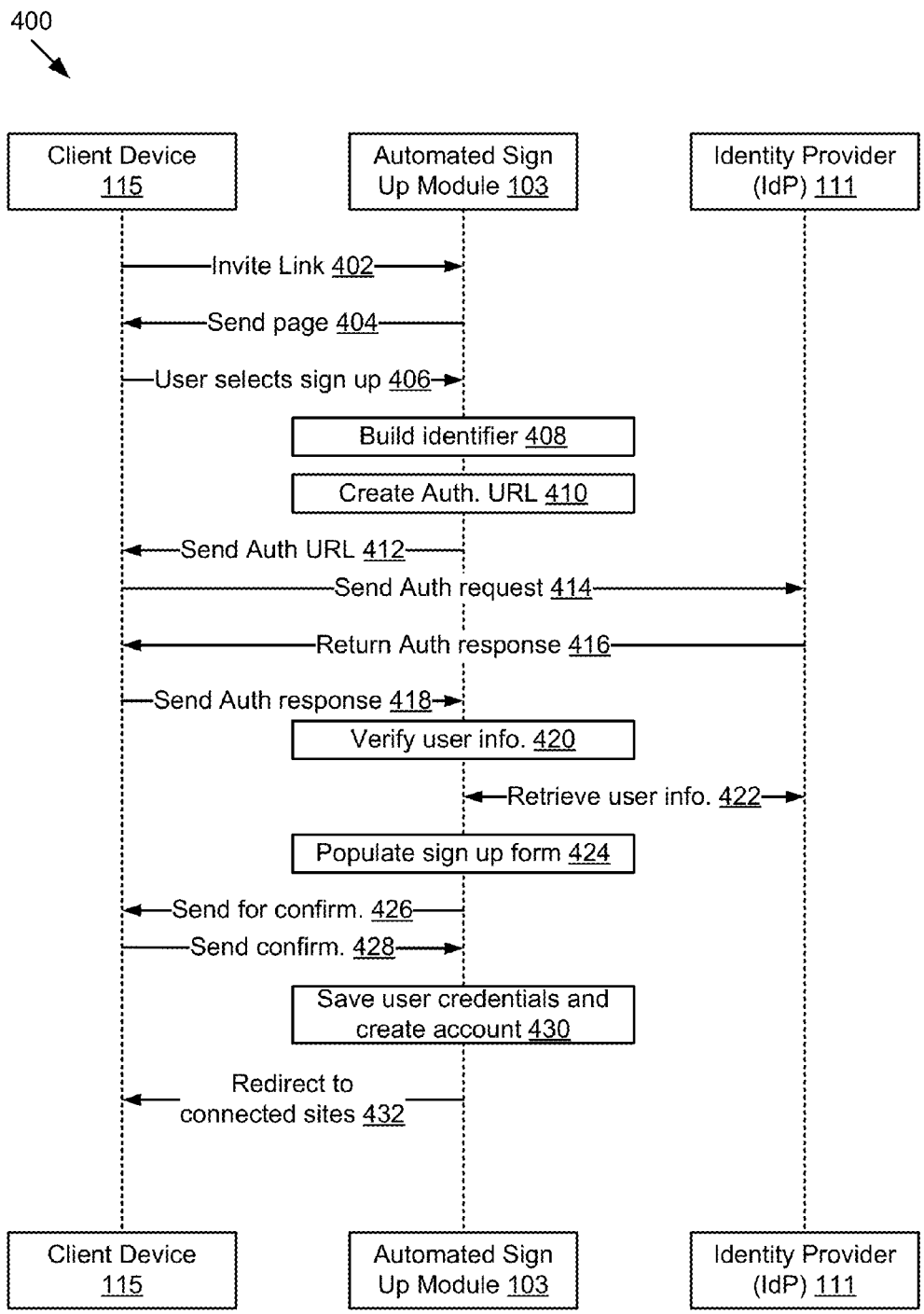
FIG. 4 is a trace diagram of an example method for automated sign up based on an existing identity.

Referring now to FIG. 4, another example of a method 400 for automated sign up based on an existing identity will be described. FIG. 4 illustrates the interactions between a user (not shown) interfacing with a client device 115, the automated sign up module 103 and an identity provider (IdP) 111, e.g., an email server 123. Although not shown, the method 400 sends an offer to the user which can be received at the client device 115. The offer includes an invite link that can be selected by the user. The method 400 begins with the user selecting the invite link in the offer which causes the client device 115 to send 402 the invite link to the automated sign up module 103. The automated sign up module 103 uses the received invite link to determine the user, the service or product corresponding to the offer and an address to which to send a response. Then the automated sign up module 103 sends 404 a page to the client device 115. In some implementations, the landing page changes depending on the users email provider and his login status. Example alternative landing pages are shown and described below with reference to FIGS. 7A and 7B. The page may be displayed to the user at the client device 115, and the user inputs a selection which causes the client device 115 to send 406 to the automated sign up module 103 a signal indicating the user has selected sign up. The automated sign up module 103 builds 408 a token identifier with the information about the user it has received. Next, the method 400 creates 410 an authorization URL that includes the token identifier and an application identifier and sends 412 the authorization URL to the client device 115. For example, OpenAuth can be used for some operations of the method 400 described above. The client device 115 sends 414 the authorization request to the identity provider 111. The identity provider 111 processes the authorization request and sends 416 an authorization response to the client device 115 which the client device 115 in turn sends 418 to the automated sign up module 103. Next, the automated sign up module 103 verifies 420 the authorization. For example, the automated sign up module 103 may call the OpenAuth to verify the remote procedure call. The OpenAuth verifies the response and saves the token identifier. In some implementations, the OpenAuth returns the user's third party identifier and the token handle. Then the automated sign up module 103 retrieves 422 user information from the identity provider 111. The user information retrieved from the identity provider 111 can be the user's name, gender, etc., as has been described above. The automated sign up module 103 uses the retrieved user information to populate 424 a sign up form (data fields for the new service or product). The populated sign up form and a confirmation request can be sent 426 by the automated sign up module 103 to the client device 115. An example of a user interface 800 generated at the client device 115 is shown in FIG. 8 and will be described below. The user interacts with the client device 115 and sends 428 a confirmation of the information from the client device 115 back to the automated sign up module 103. The automated sign up module 103 then saves 430 the credentials of the user and creates a new account for the user. For example, the above process may be undertaken using an electronic mail account of the user to generate a new account on a social network. The credentials and new account would be created on the social network. The method 400 completes by redirecting 432 the browser 150 of the client device 115 to a homepage of the social network. This method 400 may be particularly advantageous because the user need only input two selections, selecting the sign up link and selecting the confirmation button, and a new account on the system may be created automatically using information of the user from an existing identity, e.g., on identity provider 111.

Figure 5:
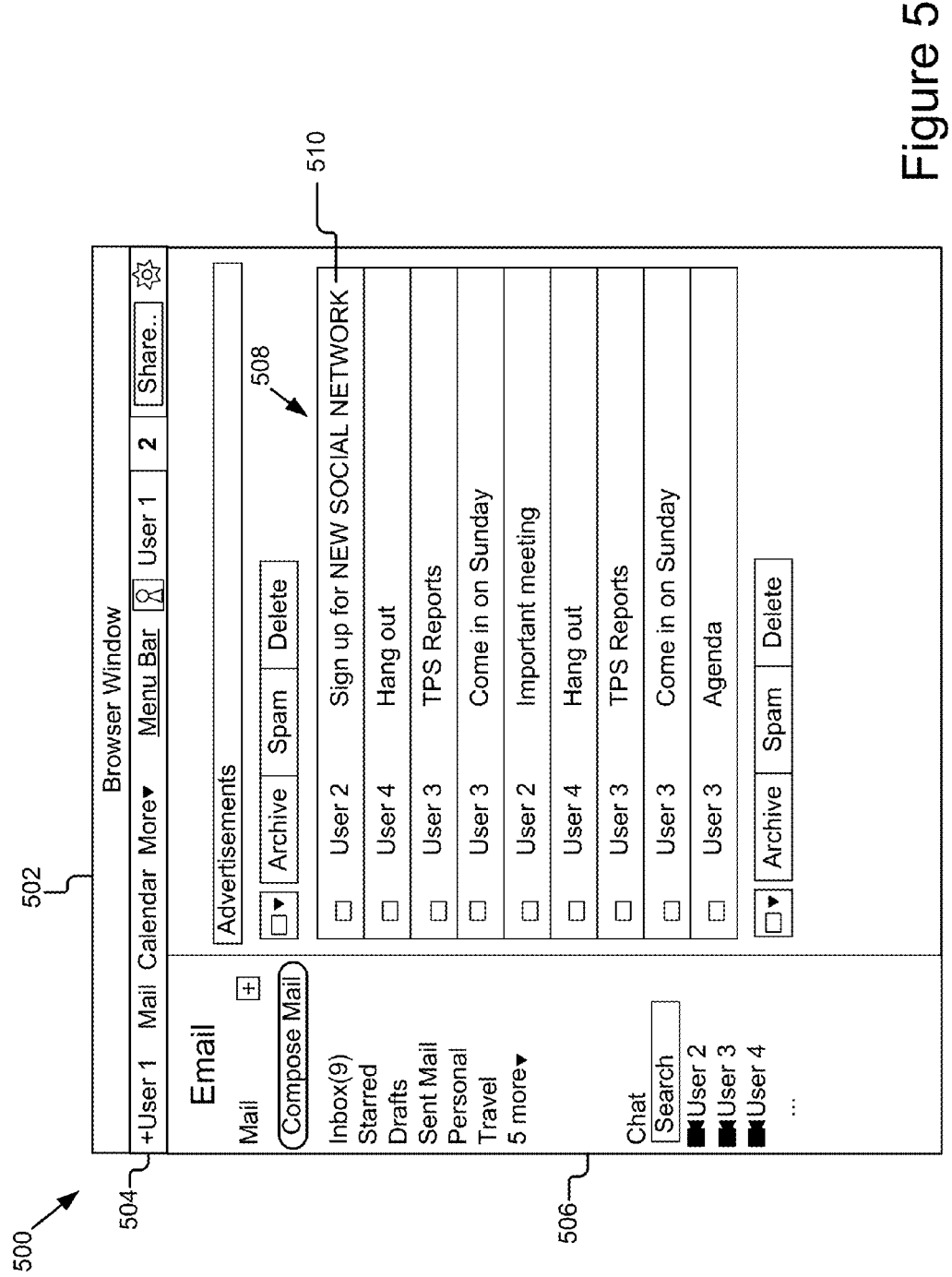
FIG. 5 is a graphic representation of an example user interface showing an electronic message inbox for providing a sign up offer.
Figure 6:
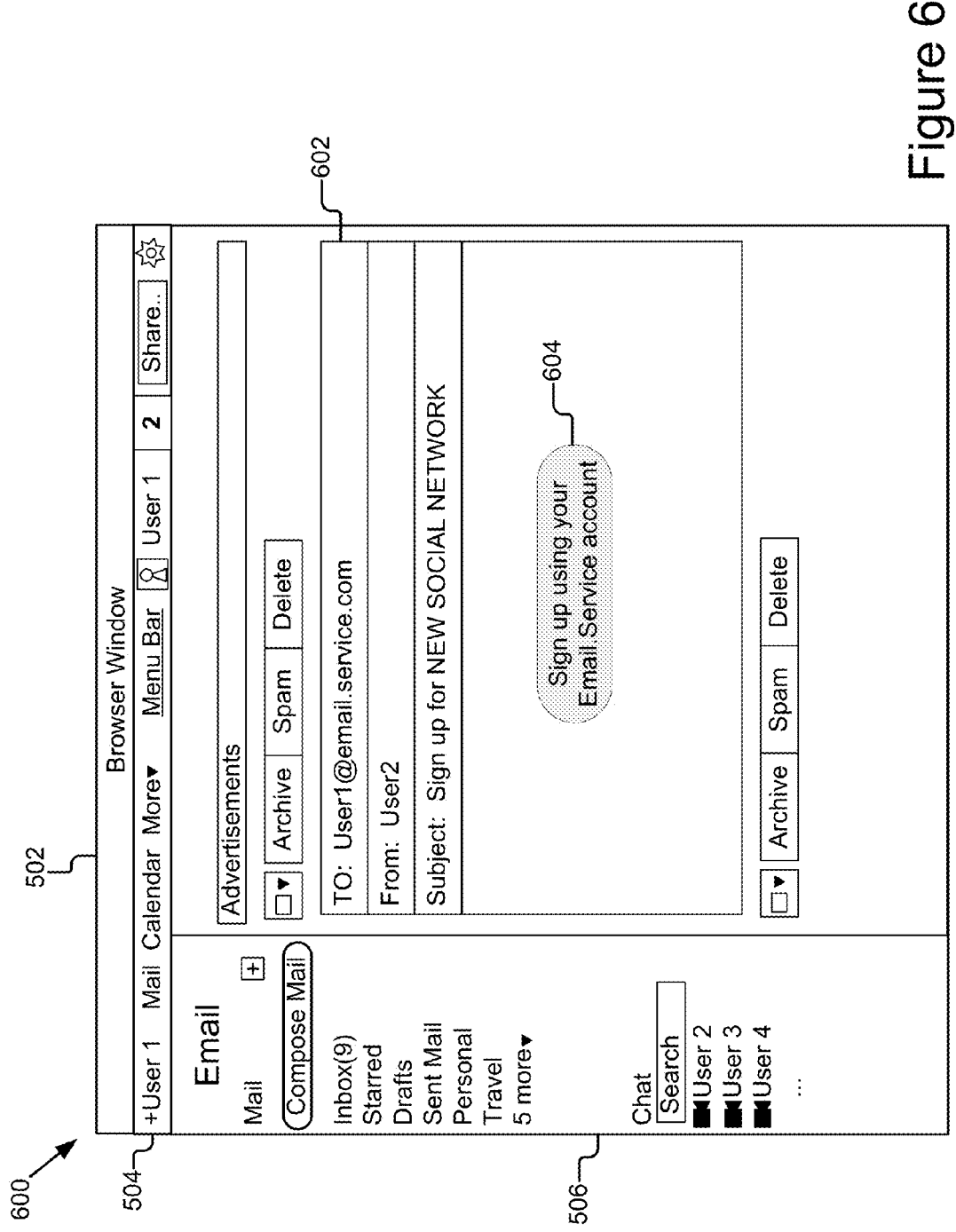
FIG. 6 is a graphic representation of an example user interface showing an electronic message providing a sign up offer.

FIG. 5 shows a user interface 500 of an electronic message inbox 508 for providing a sign up offer message 510 according to some implementations of the present disclosure. FIG. 5 shows an example user interface 500 including a browser window 502 having a tool bar 504, a left sidebar 506 and a display area. The display area includes advertisements, buttons for processing messages and an inbox 508 or a list of messages for this user, user 1. As has been described above, the automated sign up module 103, in particular the invitation generator 202, generates and sends an electronic offer message 510 that includes links and invitations to join a new product or service. FIG. 5 shows an example of the offer message 510. The message can be indicated as being sent from user 2, the user that requested the invite to be sent to the user 1. The message includes a subject line with a descriptor "Sign up for NEW SOCIAL NETWORK". The offer message 510 may be similar to other email messages in form and function.

The user interacts with the web browser 150 and selects the offer message. In response, the email editor generates the user interface 600 of FIG. 6. The user interface 600 includes a browser window 502, a tool bar 504 and the sidebar 506 as have been described above. In the display area, the electronic message 602 is shown. The electronic message 602 includes areas for identifying the sender, the receiver and the subject of the electronic message 602. The electronic message 602 also includes a message body. In accordance with the present disclosure, the message body shows a link or button 604 with a descriptor "Sign up using your Email.Service account." This link or button 604 can be selectable by the user and begins the automated sign up process. It should be noted that the link or button 604 may indicate to the user not only that the sign-up process will begin, but also that the email account of the user will be used in the sign-up process. If the user may not be interested in signing up for the "NEW SOCIAL NETWORK," the electronic message 602 may be discarded. On the other hand, if the user may be interested in signing up for the "NEW SOCIAL NETWORK," the user merely needs to click upon the button or link 604.

Figure 7A:
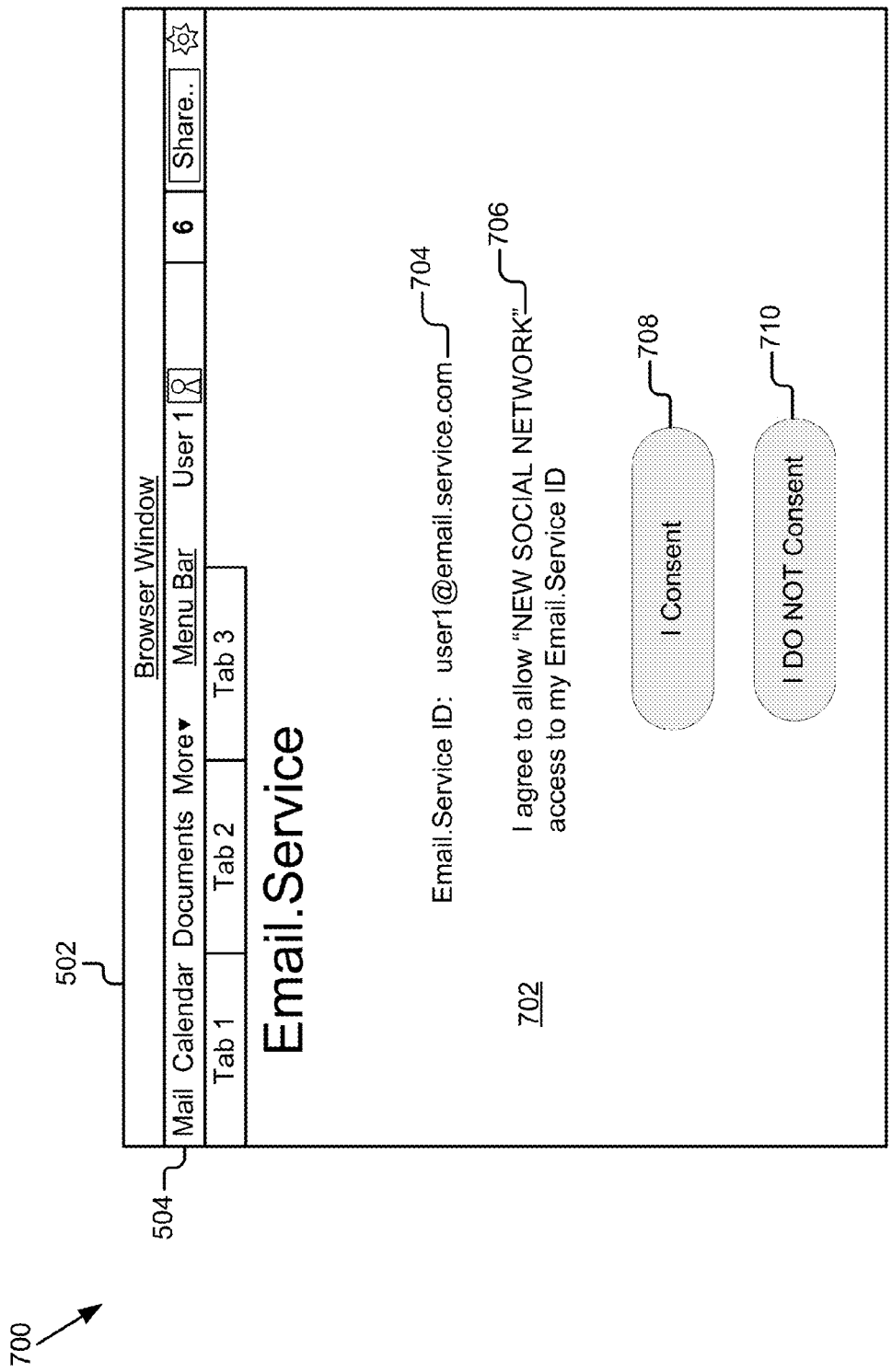
FIGS. 7A and 7B are graphic representations of example user interfaces for providing a confirmation.
Figure 7B:
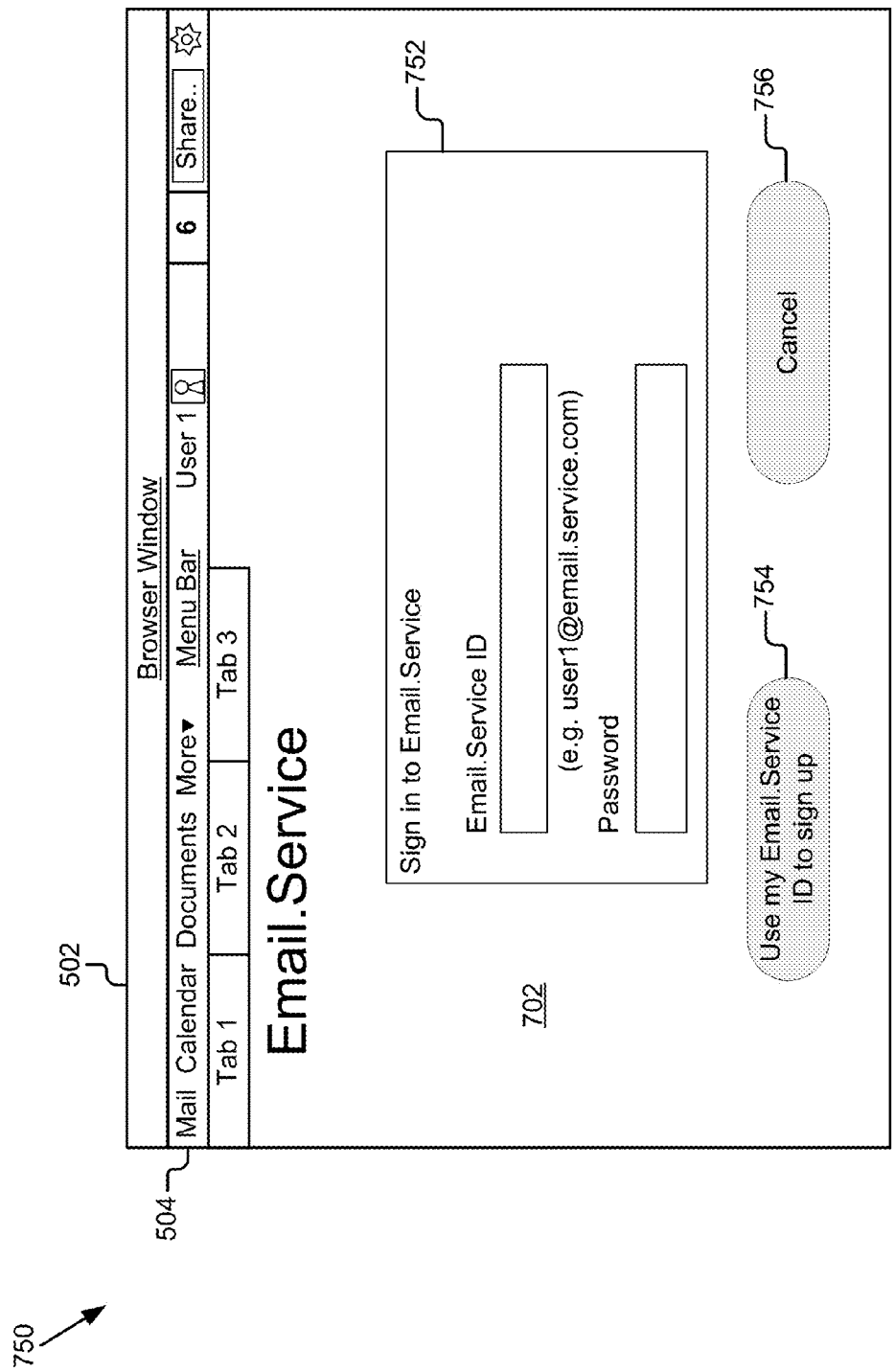
Figure 8:
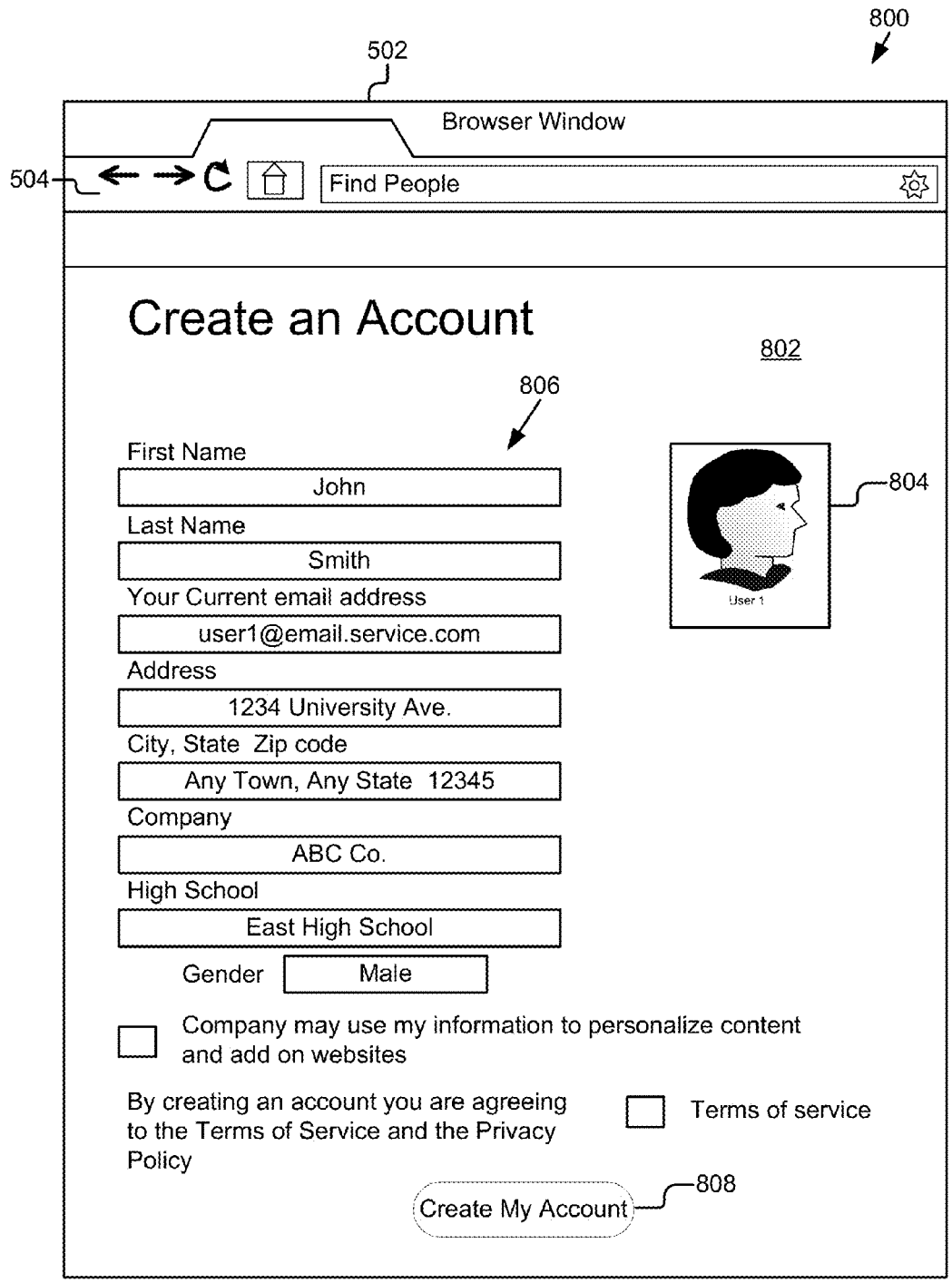
FIG. 8 is a graphic representation of an example user interface for creating an account.

FIGS. 7A and 7B show user interfaces 700, 750 for providing confirmation according to some implementations of the present disclosure. After the user has indicated that they want to sign up for a new service using an existing identity, e.g., their email account, the method shows the user interface 700 of FIG. 7A. This user interface 700 can be presented assuming that the user may be logged in to their electronic mail account. The user interface 700 can be a browser window 502 having a tool bar 504 and a display area 702. The user interface 700 also includes a label and a field 704 identifying the email account that will be used for the sign-up process. In this example, the label can be identified as "Email.Service ID" and the field 704 shows the email address of the user, "user1@ email.service.com." The user interface also includes a consent statement 706, for example, "I agree to allow 'NEW SOCIAL NETWORK' access to my Email.Service ID." The user interface 700 also includes a pair of buttons or links 708, 710. The first button 708 when selected by the user sends a consent signal to the automated sign up module 103 and continues to the sign-up process. A second button 710 when selected by the user indicates the user does not consent and ends the sign-up process.

FIG. 7B shows an alternate user interface 750 for providing confirmation according to some implementations of the present disclosure. The user interface 750 of FIG. 7B can be presented to the user after the user interface 600 of FIG. 6, but where the user may not be logged in to his email account. Thus, either the user interface 700 of FIG. 7A or the user interface 750 of FIG. 7B can be presented to the user after an expression of interest in signing up for the new product or service. This alternate user interface 750 of FIG. 7B can be a browser window 502 having a tool bar 504 and a display area 702. However, the user interface 750 includes a login box 752 for the user to input their identification name on the electronic message service and their password. The user interface 750 also includes a first button 754 that when selected will use the information in the login box 752 and continue the automated sign up process, and a second button 756 to cancel the process. In some implementations, the display area 702, the login box 752 and the first and second buttons 754, 756 have a similar appearance or look and feel as the normal login page used by the electronic message service. Having a similar look and feel provides the user with comfort and familiarity for signing up for a new product or service.

FIG. 8 can be an example of a user interface 800 for confirming information and creating an account according to some implementations of the present disclosure. The user interface 800 includes a browser window 502, a tool bar 504 and a display area 802. The display area 802 includes a photo 804 of the user, a pre-populated sign-up form 806 and a confirmation button 808. The photo 804 can be used to confirm the identity of the user, and may be retrieved from the identity provider 111 if available. The pre-populated sign-up form 806 includes a number of fields that may be required or desirable for the new product or service for which the user may be signing up. In this example, the sign-up form 806 includes a first name field, a last name field, an email address field, a physical address field, a city state and zip code field, a company field, a high school field and a gender field. Further, the fields can be populated to the extent possible with information retrieved from the identity provider 111. In some implementations, the user interface 800 also includes one or more selection boxes that may be required or optional including for accepting terms of service or privacy consents for the use of information. Finally, the user interface 800 includes a confirmation button 808 to confirm that the user wants to create an account using the information in the user interface 800. Again, FIG. 8 illustrates how the present disclosure may be particularly advantageous because the user need not input information, and the sign-up form can be pre-populated by the system with information that has been retrieved from the identity provider 111. The user needs only select the "create my account" button 808 to create a new account.

Systems and methods for automated sign up of users invited to join a site based on their existing identity has been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, video, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence leading to a result. The self-consistent sequence may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required methods. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies is in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
    sending, by one or more-processors, an offer message that generates an invite request, the offer message generated in response to a request from a first user that would like a second user to join a network or service;
    generating the offer message for known users of another system from which their identity can be retrieved
    receiving, by one or more-processors, the invite request;
    sending, by the one or more-processors, an authorization uniform resource locator;
    receiving, by the one or more-processors, an authorization response;
    retrieving, by the one or more-processors, user identity information for a user from an identity provider;
    automatically populating, by the one or more-processors, a sign up form for account creation using retrieved user identity information, the sign up form including a plurality of input fields requiring user biographical information;
    receiving, by the one or more processors, a confirmation from the user for account creation based on the user biographical information automatically populated in the sign up form; and
    responsive to receiving the confirmation from the user, creating, by the one or more-processors, the account for the user using the automatically populated sign up form.

2. The method of claim 1, further comprising:
    verifying the authorization response; and
    wherein the authorization response is used in retrieving the user identity information for the user.

3. The method of claim 1, further comprising:
    building an identifier;
    creating the authorization uniform resource locator including the identifier; and
    sending the authorization uniform resource locator.

4. The method of claim 1, wherein the user identity information for the user includes one or more of a first name, a last name, a user name and an electronic mail address.

5. The method of claim 4, wherein the identity provider is a service for which the user has one or more of an existing account and an existing identity.

6. The method of claim 1, wherein the offer message includes an invite link that when selected by the user generates the invite request.

7. The method of claim 6, wherein the offer message is sent by an electronic mail.

8. The method of claim 6, wherein the invite request is presented in a user interface similar to a service for which the user has one or more of an existing account and an existing identity.

9. The method of claim 1, further comprising sending for confirmation the populated sign up form with the user identity information, and wherein the populated sign up form with the retrieved user identity information for the user has an interface similar to a service for which the user has one or more of an existing account and an existing identity.

10. A computer program product comprising a non-transitory computer usable medium including a computer readable program, wherein the computer readable program when executed on a computer having an processor and a memory causes the computer to:
send an offer message that generates an invite request, the offer message generated in response to a request from a first user that would like a second user to loin a network or service;
generate the offer message for known users of another system from which their identity can be retrieved;
receive the invite request;
send an authorization uniform resource locator;
receive an authorization response;
retrieve user identity information for a user from an identity provider;
automatically populate a sign up form for account creation using retrieved user identity information, the sign up form including a plurality of input fields requiring user biographical information;
receive a confirmation from the user for account creation based on the user biographical information automatically populated in the sign up form; and
responsive to receiving the confirmation from the user, create the account for the user using the automatically populated sign up form.

11. The computer program product of claim 10, wherein the computer readable program when executed on the computer causes the computer to also:
verify the authorization response; and
wherein the authorization response is used in retrieving the user identity information for the user.

12. The computer program product of claim 10, wherein the computer readable program when executed on the computer causes the computer to also:
build an identifier;
create the authorization uniform resource locator including the identifier; and
send the authorization uniform resource locator.

13. The computer program product of claim 10, wherein the user identity information for the user includes one or more of a first name, a last name, a user name and an electronic mail address.

14. The computer program product of claim 11, wherein the identity provider is a service for which the user has one or more of an existing account and an existing identity.

15. The computer program product of claim 10, wherein the offer message includes an invite link that when selected by the user generates the invite request.

16. The computer program product of claim 10, wherein the offer message is sent by an electronic mail.

17. The computer program product of claim 10, wherein the invite request is presented in a user interface similar to a service for which the user has one or more of an existing account and an existing identity.

18. The computer program product of claim 10, wherein the computer readable program when executed on the computer causes the computer to also send for confirmation the populated sign up form with the user identity information; and wherein the populated sign up form with the retrieved data for the user has an interface similar to a service for which the user has one or more of an existing account and an existing identity.

19. A system comprising:
a processor, and;
a memory storing instructions that, when executed, cause the system to:
send an offer message that generates an invite request, the offer message generated in response to a request from a first user that would like a second user to loin a network or service;
generate the offer message for known users of another system from which their identity can be retrieved;
receive the invite request;
send an authorization uniform resource locator;
receive an authorization response;
retrieve user identity information for a user from an identity provider;
automatically populate a sign up form for account creation using retrieved user identity information, the sign up form including a plurality of input fields requiring user biographical information;
receive a confirmation from the user for account creation based on the user biographical information automatically populated in the sign up form; and
responsive to receiving the confirmation from the user, create the account for the user using the automatically populated sign up form.

20. The system of claim 19, wherein the offer includes a link that when selected by the user generates the invite request.

21. The system of claim 20, wherein the offer is an electronic message.

22. The system of claim 19, wherein the instructions cause the system to also:
verify the authorization response; and
wherein the authorization response is used in retrieving the user identity information for the user.

23. The system of claim 22, wherein the instructions cause the system to verify the authorization response from the identity provider.

24. The system of claim 19, wherein the instructions cause the system to also:
build an identifier;
create the authorization uniform resource locator including the identifier; and
send the authorization uniform resource locator.

25. The system of claim 19, wherein the user identity information for the user includes one or more of a first name, a last name, a user name and an electronic mail address.

26. The system of claim 22, wherein the identity provider is a service for which the user has one or more of an existing account and an existing identity.

27. The system of claim 19, wherein the instructions cause the system to present information to the user in a user interface with a similar appearance to a service for which the user has one or more of an existing account and an existing identity.

28. The system of claim 26, wherein the instructions cause the system to also provide a sign up form populated with user account data.

29. The system of claim 22, wherein the identity provider is an electronic message service for which the user has one or more of an existing account and an existing identity, and the new service is a social network service.

30. The computer-implemented method of claim 1, wherein the user biographical information includes one or more of a user's first name, last name, email address, street address, age, gender, contacts, employment information, and education information.

31. The computer program product of claim 10, wherein the user biographical information includes one or more of a user's first name, last name, email address, street address, age, gender, contacts, employment information, and education information.

32. The system of claim 19, wherein the user biographical information includes one or more of a user's first name, last name, email address, street address, age, gender, contacts, employment information, and education information.

\* \* \* \* \*